United States Patent [19]

Liencres

[11] Patent Number: 5,497,470
[45] Date of Patent: Mar. 5, 1996

[54] METHOD AND APPARATUS FOR PROVIDING A HIGH THROUGH PUT CACHE TAG CONTROLLER

[75] Inventor: Bjorn Liencres, Palo Alto, Calif.

[73] Assignee: Sun Microsystems, Inc., Mountain View, Calif.

[21] Appl. No.: 885,118

[22] Filed: May 18, 1992

[51] Int. Cl.⁶ .................................................. G06F 13/14
[52] U.S. Cl. ........................ 395/403; 395/467; 395/468
[58] Field of Search ...................................... 395/425, 403, 395/467, 468

[56] References Cited

U.S. PATENT DOCUMENTS

| | | | |
|---|---|---|---|
| 5,125,083 | 6/1992 | Fite et al. | 395/375 |
| 5,224,214 | 6/1993 | Rosich | 395/250 |

*Primary Examiner*—Mark R. Powell
*Attorney, Agent, or Firm*—Blakely Sokoloff Taylor & Zafman

[57] ABSTRACT

A cache tag controller for a cache tag memory for receiving multiple consecutive cache tag modify operations through a system bus to update cache tags in the cache tag memory. The cache tag controller comprises memory for storing cache tags; address register coupled to the memory for specifying a cache tag in the memory, the address register receiving a first modify operation from a system bus; read register coupled to the memory for reading the cache tag according to the address; first update circuit coupled to the read register for modifying the cache tag based on the first modify operation; stage register coupled to the first update circuit for storing an updated cache tag outputted from the first update circuit in response to the first modify operation; compare circuit coupled to the system bus for determining whether a second modify operation from the system bus is for the same cache tag in the memory as the first modify operation, the second modify operation being transmitted from said system bus before the first modify operation completes writing to the memory; second update circuit coupled to the stage register and compare circuit for modifying the updated cache tag in the stage register means according to the second modify operation if the modify operation is for the same cache tag as the first modify operation; and write register coupled to the memory for writing the first and second updated cache tags to the memory means as specified by the address from the address register.

12 Claims, 5 Drawing Sheets

H = Header
D = Data

| Time \ Position | Bus-In | Delay 1 | Delay 2 | Addrs. Reg. | Read Reg. | Tag-Stage | Write Reg. |
|---|---|---|---|---|---|---|---|
| $t_1$ | 11 H1 | | | | | | |
| $t_2$ | 21 D1 | 22 H1 | | 24 H1 | | | |
| $t_3$ | 31 H2 | 32 D1 | 33 H1 | | 35 H1 | | |
| $t_4$ | 41 D2 | 42 H2 | 43 D1 | 44 H2 | | 46 H1 / D1 | |
| $t_5$ | | 52 D2 | 53 H2 | 54 H1 | 55 H2 | | 57 H1 |
| $t_6$ | 61 H3 | | 63 D2 | | | 66 H2 / D2 | |
| $t_7$ | 71 D3 | 72 H3 | | 74 H3 | | 76 H2 / D2 | 77 |
| $t_8$ | | 82 D3 | 83 H3 | 84 H2 | 85 H3 | | 87 H2 |
| $t_9$ | | | 93 D3 | | | 96 H3 / D3 | |
| $t_{10}$ | | | | 104 H3 | | | 107 H3 |

Figure 4b

METHOD AND APPARATUS FOR PROVIDING A HIGH THROUGH PUT CACHE TAG CONTROLLER

BACKGROUND OF THE INVENTION

1. Field of the Invention

The present invention relates to cache memories in a multiprocessor computer system and more specifically to cache tag addresses and their controllers in such a multiprocessor system.

2. Art Background

In a computer system, caches are used for storing selected memory data in a random-access memory ("RAM") that is readily accessible to the processor. A cache typically includes a RAM for storing the memory data, a tag RAM for storing the indices, i.e. tags, to this memory data, and associated control logic for this tag RAM.

In a multiprocessor system with each processor having its own cache, the caches must be kept consistent as one processor may cause another processor's cache to contain invalid data by updating a memory data. Consistency thus requires that if one processor updates the memory data cached in a different processor, the other processor must know that the data has been altered. In a bus-based system, all caches can be updated by "snooping": if all caches are connected to the same system bus, these caches monitor the system bus to determine if a particular address, which may be cached, is being updated by accessing and reading their own tag RAM. If the referenced memory location is cached, the tag RAM may have to be updated. Thus, the tag data must be read out, and possibly modified, and written back to the tag RAM. If each memory transaction takes several cycles, this read-modify-write sequence can take place over several cycles as well.

Reference is now made to FIG. 1, where a prior art two-cycle tag RAM update scheme is shown. An update address is transmitted from system bus 100 to address register 110, which reads out from tag RAM 120. Within the same cycle, the tag is updated by update circuit (unclocked) 130, which is a well-known technique in the art. During the second cycle, the new tag is written back to tag RAM 120 through write register 140. As shown in FIG. 1, the minimum rate at which these memory transactions could take place is at one every two cycles, because it is not possible to do a read and write in one cycle with single-port RAMs. Also, within the two cycles, the modified data has to be computed in the same cycle that the tag is read or written. RAM access time, however, does not scale as logic does. Thus, while cycle time continues to decrease, RAM access time decreases at a lower rate. With the two-cycle implementation, a slower clock rate is typically required as more work has to be performed in the cycle. With the cycle time gradually approaching the RAM access time, it becomes nearly impossible and impractical to do the read of the tag and compute the next state in one cycle, and write in the following cycle. It is also equally impossible to do the read in one cycle, and then compute the next state and perform the write in the following cycle. Further, when two consecutive transactions are intended for the same address, a two cycle model risks having the second transaction access an invalid tag before the first transaction has written back its updated tag. As more multiprocessor systems are connected through packet-switched buses, the frequency of having consecutive updates toward the same tag address increases.

FIG. 2 illustrates a three-cycle tag RAM update scheme: one cycle for reading from address register 210 through tag RAM 220, one for modifying the tags from read register 250 through update circuit 230, and one cycle for writing the tags back to tag RAM 220 through write register 240. In contrast to its two-cycle counterpart, a three-cycle transaction can run at a faster clock rate, but at a cost of latency. As such, it becomes desirable to have a cache tag controller with high-throughput and yet with a low latency.

SUMMARY OF THE INVENTION

Therefore, it is an object of the present invention to provide a cache tag controller with high throughput of tag update operations.

It is another object of the present invention to provide a cache tag controller with low latency.

It is further an object of the present invention to provide a cache tag controller with a bypass mechanism for consecutive modify operations toward the same address.

It is also an object of the present invention to provide a cache tag controller operative upon a single port cache tag RAM with pipeline stages to avoid simultaneous read and write conflict.

A cache tag controller for a cache tag memory for receiving multiple consecutive cache tag modify operations through a system bus to update cache tags in the cache tag memory is disclosed. The cache tag controller comprises memory for storing cache tags; address register coupled to the memory for specifying a cache tag in the memory, the address register receiving a first modify operation from a system bus; read register coupled to the memory for reading the cache tag according to the address; first update circuit coupled to the read register for modifying the cache tag based on the first modify operation; stage register coupled to the first update circuit for storing an updated cache tag outputted from the first update circuit in response to the first modify operation; compare circuit coupled to the system bus for determining whether a second modify operation from the system bus is for the same cache tag in the memory as the first modify operation, the second modify operation being transmitted by the system bus before the first modify operation completes writing to the memory; second update circuit coupled to the stage register and the compare circuit for modifying the updated cache tag in the stage register means according to the second modify operation if the modify operation is for the same cache tag as the first modify operation; and write register coupled to the memory for writing the first and second updated cache tags to the memory means as specified by the address from the address register.

BRIEF DESCRIPTION OF THE DRAWINGS

The objects, features and advantages of the present invention will be apparent from the following detailed description of the preferred embodiment which:

FIG. 4(b) is a timing diagram illustrating the movement of header and data cycles in the cache tag controller.

DETAILED DESCRIPTION OF THE INVENTION

A method and apparatus for a cache tag controller with high throughput and low latency is disclosed. In the following description for purposes of explanation, specific memories, organizations, and architectures, etc. are set forth in order to provide a thorough understanding of the present invention. However, it will be apparent to one skilled in the art that the present invention may be practiced without these specific details. In other instances, well known circuits are shown in block diagram form in order not to obscure the present invention unnecessarily.

Figure 1:
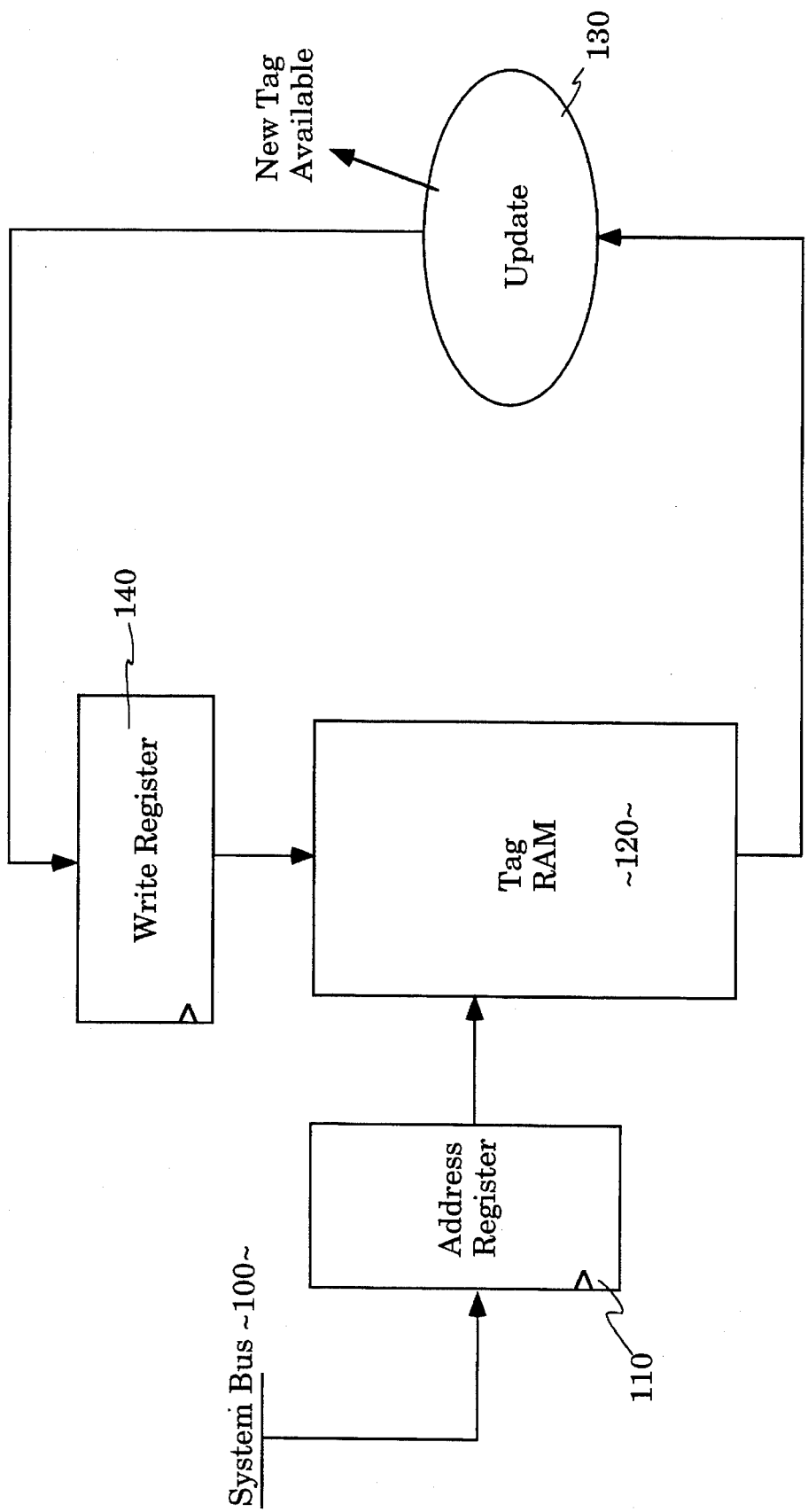
FIG. 1 is a simplified block diagram illustrating a prior art two-cycle tag RAM update circuit.
Figure 2:
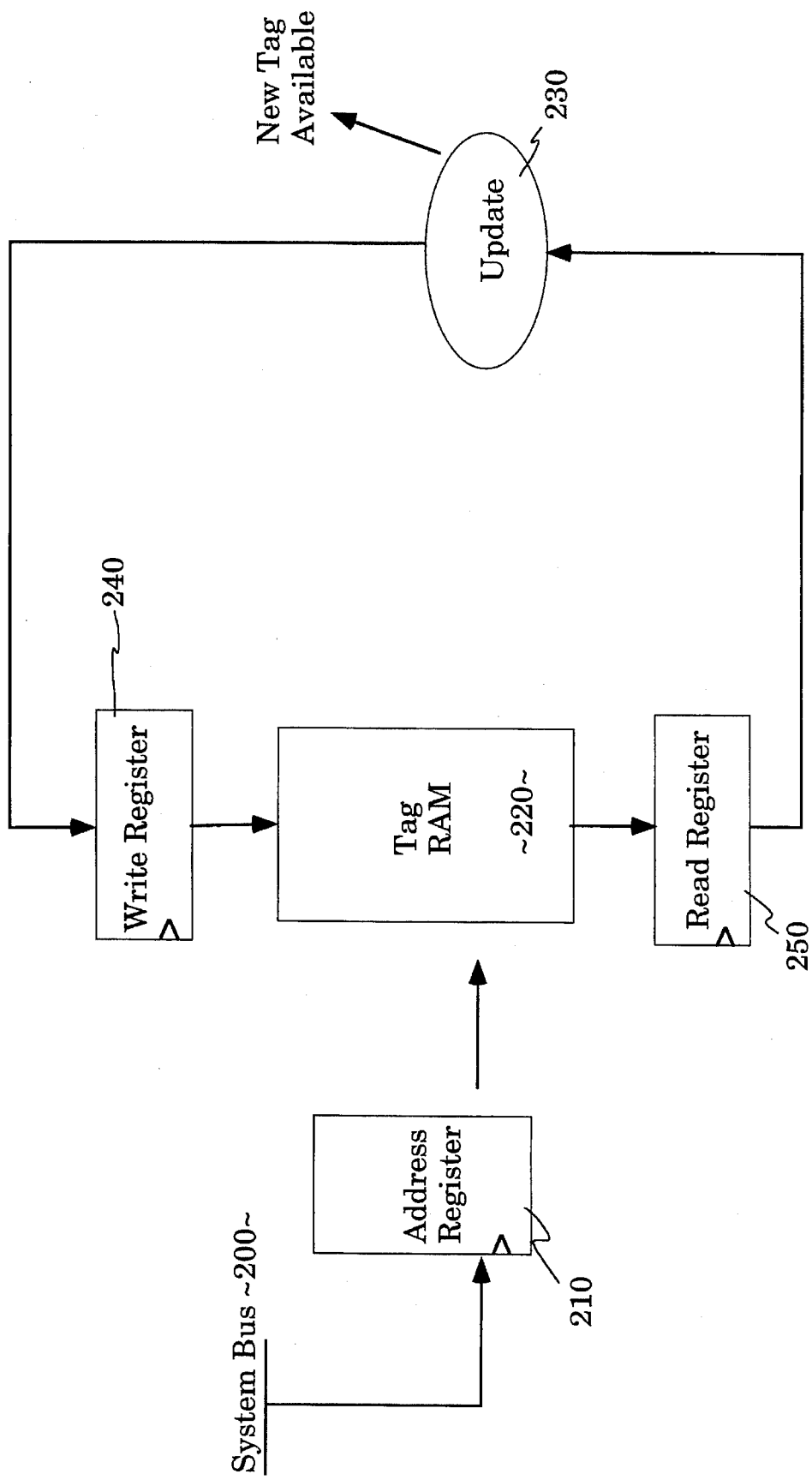
FIG. 2 is a simplified block diagram illustrating a prior art three-cycle tag RAM update circuit.
Figure 3:
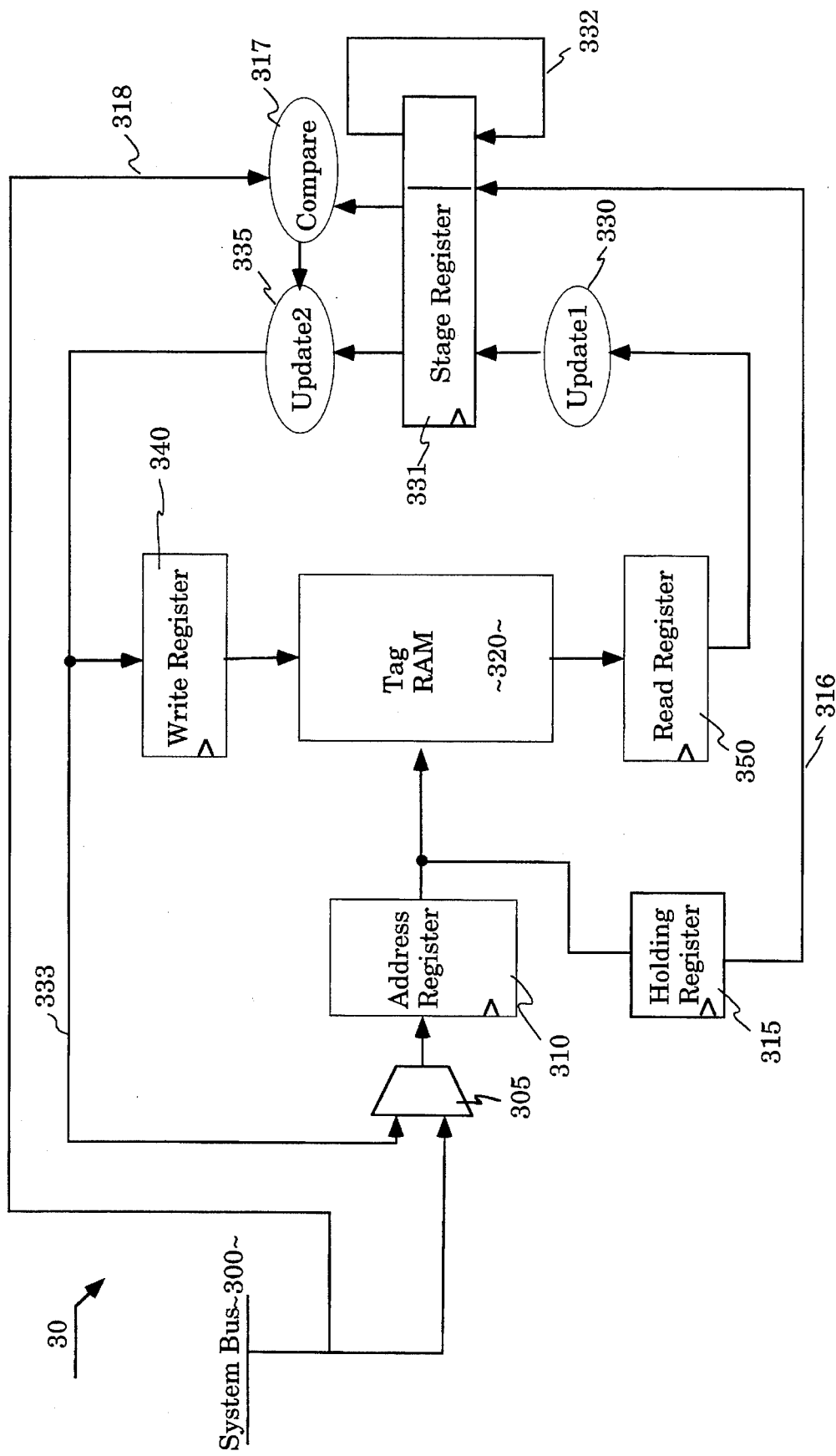
FIG. 3 is a simplified functional block diagram of the cache tag controller of one embodiment.

FIG. 3 is a simplified functional block diagram of the cache tag controller 30 of one embodiment. As shown in FIG. 3, tag RAM 320 is coupled to address register 310, write register 340 and read register 350. Address register 310 receives an address to be modified from system bus 300 through a multiplexor 305. The update mechanism of the controller 30 comprises update 1 330, stage register 331, and update 2 335, which are coupled between read register 350 and write register 340. A holding register 315 is also operationally coupled between address register 310 and stage register 331. A compare circuit 317 is coupled between stage register 331 and system bus 300. A holding register 315 is coupled between the address register 310 and the stage register 331. Holding register 315 transfers data to the stage register 331 through data path 316.

With reference made to FIG. 3, the operation of the cache tag controller 30 will be described as follows. A modify operation for a cache tag from system bus 300 is received by address register 310 through multiplexor 305. The address from address register 310 will specify a location in tag RAM 320 to be read out to read register 350. The tag from read register 350 is then updated by update 1 circuit 330, which is a well-known technique in cache memory operations as will be appreciated by those skilled in the art. The updated tag is output to stage register 331 from update 1 330. A feedback path 332 is coupled to stage register 331 for delaying the information stored in the stage register 331 for one clock cycle. The use of this feedback path 332 will be further described with reference to FIGS. 4 and 4b. In the event that there is only one tag modify operation, the updated tag is written back to tag RAM 320 through write register 340 as specified by the tag address shown at address register 310. Note that update 2 335 does not act on the already updated tag in this single-modify situation. Similarly, a second cache tag modify transaction from system bus 300 may be received by address register 310 to read out a second tag from tag RAM 320 to be updated. After the update, the updated second tag is written back to tag RAM 320 through write register 340 to the address specified.

Although the present cache tag controller 30 completes a tag modify transaction from system bus 300 in four cycles: cycle 1 at address register 310, cycle 2 at read register 350, cycle 3 at stage register 331 and cycle 4 at write register 340, it has a unique benefit of generating a throughput at the rate of one transaction every two cycles when two transactions modifying the same tag address are back-to-back from system bus 300. It should be apparent to those skilled in the art that in a back-to-back transaction situation, the second modify transaction modifying the same tag address will normally proceed through the same path as the first transaction such that the second transaction ends up reading the "old" tag value when it is supposed to read the tag value already modified by the first one. As can be seen in FIG. 3, a bypass path 318 is implemented to couple incoming address from system bus 300 with update 2 335 to allow the second transaction to snoop on the result of the first modify transaction already stored in stage register 331. As such, when the second transaction is received by address register 310, the second address can be compared 317 against the tag address from the first transaction to verify whether they are modify transactions for the same tag address or not. It should be apparent to those skilled in the art that the compare function can be performed within the same cycle as it is typically implemented by unclocked combinational logic. If the addresses match, the second transaction will know that the tag it is modifying is already updated and the new tag is residing at stage register 331 due to the update by the first transaction. Subsequently, the twice updated tag can be written back to tag RAM 320 through write register 340. The twice updated tag may be written to write register 340 or to multiplexor 305 through data path 333. On the other hand, if the second transaction does not seek to modify the same tag as the first, the second transaction will proceed through the normal path: tag RAM 320, read register 350, update 1 330, stage register 331 and write register 340.

With reference still made to FIG. 3, the cache tag controller 30 of one embodiment also resolves a read/write conflict at the single-port tag RAM 320. The conflict arises when the first transaction seeks to update a tag in tag RAM 320 while the second transaction from system bus 300 seeks to read tag RAM 320 at the same time. Although this conflict can easily be solved by making tag RAM 320 a dual-port RAM in that the RAM has one port for reading and one port for writing, it becomes costly in terms of silicon area as the RAM gets larger and larger in view of today's computer technology. Furthermore, because system bus 300 is typically a packet-switched bus in that there is no practical way to stall system bus 300 from transmitting packets to cache tag controller 30 while allowing tag RAM 320 to be read and then written.

Figure 4A:
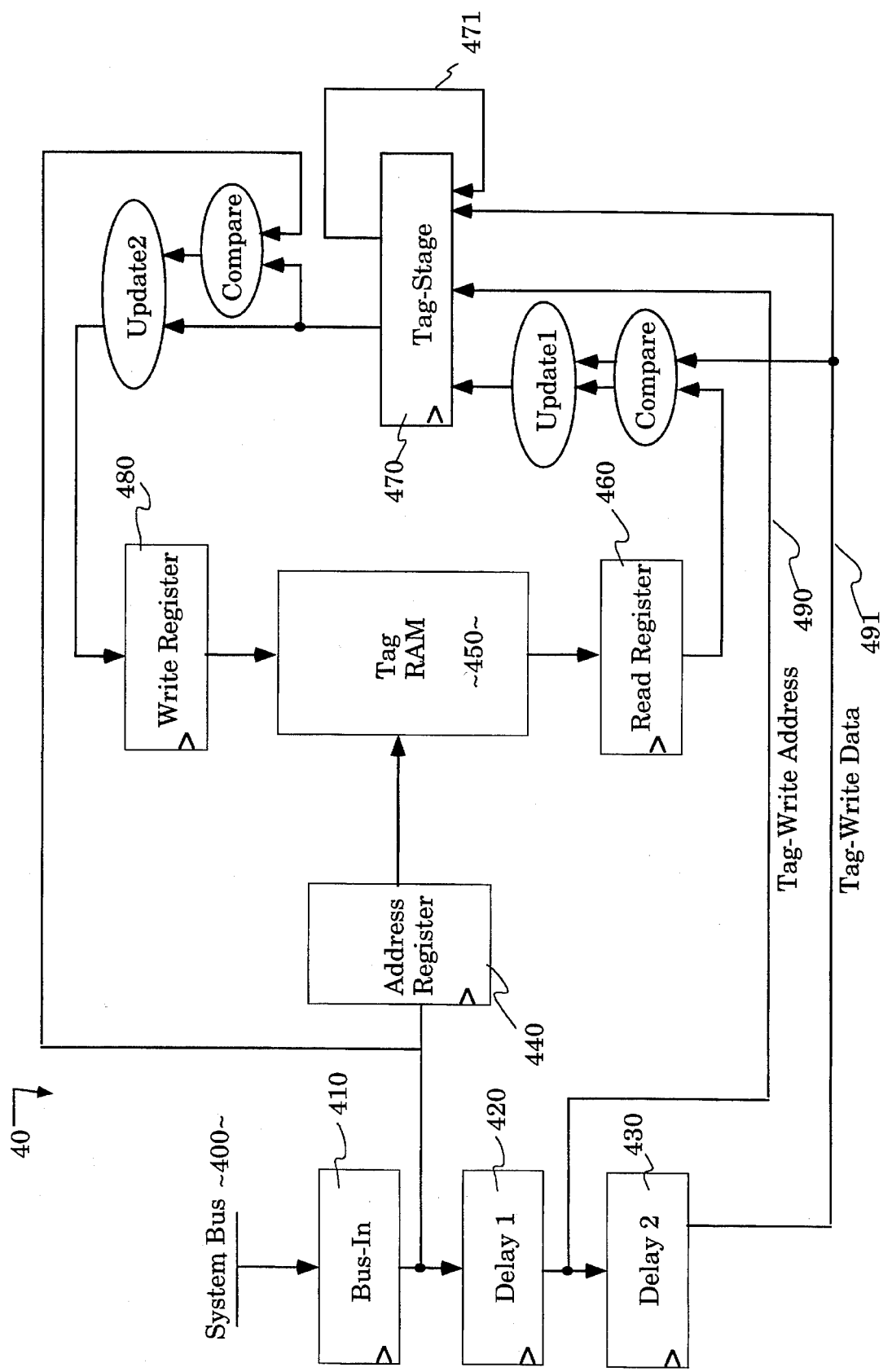
FIG. 4(a) illustrates a block diagram for a cache tag controller with pipeline stages.

Reference is now made to FIGS. 4a and 4b, where FIG. 4a illustrates the cache tag controller 40 with pipeline stages and FIG. 4b illustrates the movement of header and data cycles as they proceed through the pipelining stages in FIG. 4a. In this embodiment, the header cycle contains an address, while the data cycle contains the data as they are transmitted from system bus 400. In a first situation, with reference also to FIG. 4(b), two packets, H1-D1 and H2-D2, are back-to-back received by cache tag controller 40. At t1, H1 is at Bus-In 410. At t2, H1 is at delay1 420 and address register 440 (locations 22 and 24 of FIG. 4(b)). At t3, H1 is at delay2 430 and read register 460 (location 35); at t4, H1 is at stage register 470 with its updated tag information from tag RAM 450. Delay to 430 is coupled to tag-stage 470 through tag-write path 491. It should be noted that for a tag modify transaction, the header contains all the necessary control information for modifying the tag in tag RAM 450. Thus, the head cycles are of interest for such operations. After the tag information is updated, which does not incur a pipeline delay due to the combinational logic, it is at write register 480 at t5, ready to write back to the tag RAM 450. Now in terms of the second packet following immediately after the first packet: at t3, H2 is at Bus-In 410; at t4, H2 is at address register 440, where it can access tag RAM 450. As such, H2 seeks to read tag RAM 450 at t4 (location 44), while H1 seeks to write tag RAM 450 at t5 (location 57). Thus, no read/write conflict arises by virtue of the fact that H1 is delayed one pipeline stage by tag stage register 470 at t4.

With reference still made to FIGS. 4a and 4b, the situation where the two packets, H2-D2, and H3-D3, are one cycle apart is described. H2 follows the same path as H1 in the previous situation and reaches tag stage register 470 at t6 (location 66 of FIG. 4b). With respect to H3, H3 is received from system bus 400 at Bus-In 410 t6, and H3 reaches address register 440 at t7, ready to read tag RAM 450. Note that reading by H3 at t7 (location 74) and the potential writing by H2 at t7 (location 77) would cause a simultaneous read/write conflict at t7. However, with a feedback path 471 coupled to tag stage register 470, H2 is delayed one cycle to remain at the same pipeline tag stage register 470 (location 76). As such, H2 reaches write register 480 at t8, ready to write to tag RAM 450, which is now one cycle after reading by H3 at address register 440. It should be apparent to those skilled in the art that there are essentially only two header-arrival situations for packet-switched buses, i.e. when the packets are immediately following each other and when they are one cycle apart. Further, because when the packets are two cycles apart it becomes the equivalent situation as if they were zero cycles apart. It should be noted that data cycles have heretofore been disregarded for the reason that in a typical cache tag modify transaction, the necessary control and address information are contained in the header cycles so that once the memory address is received from the bus, an index into the tag RAM 450 can be selected and all modifications will occur thereafter. With respect to the data cycles, they contain the necessary data information when a programmer intends to explicitly write to the tag RAM through the data cycles. It should be noted that there is no data written into the tag RAM 450 for the tag modify operations except the tag address and its flags.

Referring now to FIG. 4b, the operation of writing directly to tag RAM 450 with address or data through the data cycle is described. Data cycle D1 is at Bus-In at t2, at delay 1 420 at t3 and joins H1 at tag stage register 470 at t4 through tag-write path 490, which is for the situation of tag address write. At t5, H1 is at write register 480, ready to write data directly into tag RAM 450. With respect to H2, it moves from Bus-In 410 at t3 to address register 440 at t4, thus causing no read and read/write conflict at the tag RAM 450 between H1 and H2 in view of the delay1 420 and tag-write path 490.

Similarly, with respect to the non-consecutive packets, H2-D2 and H3-D3, header cycle H3 moves from Bus-In 410 at t6, through address register at t7, to read tag RAM 450. Data cycle D3 moves from Bus-In 410 at t3, to delay1 at t8, and then H3 at tag stage register 470 at t9. As can be seen from FIG. 4b, the writing of H2-D2 to tag RAM 450 occurs one cycle after the reading of tag RAM 450 by H3-D3. No conflict arises for the single-ported tag RAM 450. But note that H2/D2 was delayed from t6 to t7.

Tag stage register 470 typically contains tag address, index into the tag RAM 450 for the tag address to be returned to, and the flags. The flags typically are the ones that get updated in a cache tag modify operation. Ordinarily, the tag addresses do not change because when another processor issues a read or write on the system bus, only the flags are changed while the tag addresses are kept the same. However, when a processor wants to replace a location of the tag address with a tag modify transaction, the tag address, as well as the index, would have to be updated through a data cycle in the packet.

As described, the cache tag controller of the present invention achieves a throughput of one transaction per two cycles by performing two transactions with multiple updates in four cycles, thus giving an appearance of one in each two cycles. Furthermore, the present invention implements additional pipeline stages to avoid read/write conflicts at the tag RAM of a single-ported tag RAM without sacrificing the silicon area for a dual-ported tag RAM. It will be appreciated by those skilled in the art that if a dual-port tag RAM is used, the read/write conflict at the tag RAM will obviate the pipeline stages implemented in the single-ported tag RAM of the present invention. However, the two updates and the snoop path features of the present invention will still increase the throughput and decrease the latency of the tag RAM controller as a whole. Furthermore, it will be appreciated by those skilled in the art that various logic and pipeline stages may be implemented in conjunction with the present invention to make data become available within a deterministic number of cycles as desirable for the present multiprocessor systems.

I claim:

1. A cache tag controller for a cache tag memory coupled to a system bus for receiving multiple cache tag modify operations to update cache tags in said cache tag memory said cache tag controller comprising:

memory means for storing cache tags;

address register means coupled to said memory means for specifying a cache tag in said memory means, said address register means receiving a first modify operation from said system bus;

read register means coupled to said memory means for reading said cache tag according to said address means;

first update means coupled to said read register means for modifying said cache tag based on said first modify operation;

stage register means coupled to said first update means for storing a once-updated cache tag outputted from said first update means in response to said first modify operation;

compare means coupled to said system bus for determining whether a second modify operation, the second modify operation being received subsequent to the first modify operation being received by the address register means from said system bus, is for the same cache tag in said memory means as said first modify operation, if said second modify operation is transmitted from said system bus before said first modify operation completes writing to said memory means;

second update means coupled to said stage register means and said compare means for modifying said once-updated cache tag in said stage register means according to said second modify operation if said modify operation is for the same cache tag as said first modify operation; and write register means coupled to said memory means for writing at least one of the once-updated cache tag and a twice-updated cache tag to said memory means as specified by said address from said address register means.

2. A cache tag controller according to claim 1, further comprising:

first pipeline means coupled between said address register means and said stage register means for delaying said second modify operation until said first modify operation completes its operation by storing said first updated cache tag in said stage register means;

second pipeline means coupled to said stage register means for delaying said second updated cache tag until said first updated cache tag is written to said memory means.

3. A cache tag controller according to claim 2, wherein said first pipeline means is a register and said second pipeline means is a feedback into said stage register means.

4. A cache tag controller according to claim 1, wherein said memory means is a single-port RAM.

5. A cache tag controller according to claim 1, wherein said modify operation specifies a tag address in said cache tag memory and updates at least one flag in the cache tag.

6. A cache tag controller according to claim 5, wherein said modify operation writes directly to a cache tag stored in the memory means, and changes at least one of an address field and an index field in the cache tag.

7. A method of updating a cache tag memory having a plurality of cache tags, the cache memory being coupled to a system bus for receiving multiple cache tag modify operations to update cache tags in said cache tag memory, said method comprising the steps of:

receiving a first modify operation from said system bus by address register means coupled to said memory means, said first modify operation specifying a cache tag in said memory means;

reading said cache tag according to said address means by read register means coupled to said memory means;

modifying said cache tag based on said first modify operation by first update means coupled to said read register means;

storing a once-updated cache tag outputted from said first update means in response to said first modify operation in stage register means coupled to said first update means;

receiving a second modify operation from said system bus;

determining whether said second modify operation, the second modify operation being received subsequent to the first modify operation being received by the address register means from said system bus, is for the same cache tag in said memory means as said first modify operation by compare means coupled to said system bus, if said second modify operation is transmitted from said system bus before said first modify operation completes writing to said memory means;

modifying said once-updated cache tag in said stage register means according to said second modify operation by second update means coupled to said stage register means and said compare means, if said modify operation is for the same cache tag as said first modify operation; and writing at least one of the once-updated cache tag and a twice-updated cache tag to said memory means as specified by said address from said address register means by write register means coupled to said memory means.

8. A method according to claim 7, further comprising the steps of:

delaying said second modify operation until said first modify operation completes its operation by storing said first updated cache tag in said stage register means by first pipeline means coupled between said address register means and said stage register means; and delaying said second updated cache tag until said first updated cache tag is written to said memory means by second pipeline means coupled to said stage register means.

9. A method according to claim 8, wherein said first pipeline means is a register and said second pipeline means is a feedback into said stage register means.

10. A method according to claim 7, wherein said memory means is a single-port RAM.

11. A method according to claim 7, wherein said modify operation specifies a tag address in said cache tag memory and updates at least one flag in the cache tag.

12. A method according to claim 11, wherein each of said modify operation writes directly to a cache tag stored in memory means, and changes at least one of an address field and an index field in the cache tag.

* * * * *